(12) United States Patent
Reimnitz (10) Patent No.: US 12,374,957 B2
(45) Date of Patent: Jul. 29, 2025

(54) ELECTRIC MACHINE ARRANGEMENT

(71) Applicant: Schaeffler Technologies AG & Co. KG, Herzogenaurach (DE)

(72) Inventor: Dirk Reimnitz, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 229 days.

(21) Appl. No.: 18/022,814

(22) PCT Filed: Jun. 23, 2021

(86) PCT No.: PCT/DE2021/100533
§ 371 (c)(1),
(2) Date: Feb. 23, 2023

(87) PCT Pub. No.: WO2022/042783
PCT Pub. Date: Mar. 3, 2022

(65) Prior Publication Data
US 2023/0327514 A1     Oct. 12, 2023

(30) Foreign Application Priority Data

Aug. 26, 2020   (DE) .......................... 102020122246.7

(51) Int. Cl.
*H02K 7/08* (2006.01)
*H02K 21/12* (2006.01)
(52) U.S. Cl.
CPC ............. *H02K 7/085* (2013.01); *H02K 21/12* (2013.01)
(58) Field of Classification Search
CPC .................................. H02K 1/18; H02K 7/085

USPC .................. 310/49.22, 114, 266–268, 90
See application file for complete search history.

(56) References Cited

U.S. PATENT DOCUMENTS

2018/0015815 A1    1/2018  Makino et al.

FOREIGN PATENT DOCUMENTS

| CN | 109245400 | 1/2019 | |
| DE | 4323599 | 10/1994 | |
| DE | 202009014189 | 4/2011 | |
| DE | 102018114382 | 12/2019 | |
| DE | 102018114794 | 12/2019 | |
| DE | 102018114794 A1 * | 12/2019 | ............. B60K 6/387 |
| EP | 1624552 | 3/2009 | |

* cited by examiner

*Primary Examiner* — Jose A Gonzalez Quinones
(74) *Attorney, Agent, or Firm* — Volpe Koenig (57) ABSTRACT

An electric machine arrangement with first and second electric machines, each having a stator and a rotor, and a common housing in which the electric machines are arranged axially adjacently. Respective output shafts are rotationally fixed with the rotors of the first and second electric machines. The rotor of the first electric machine, on its side away from the second electric machine, is arranged with radial support of a supporting part of the housing rotatably mounted by a first bearing, and the rotor of the second electrical machine, on its side facing away from the first electric machine, is arranged with radial support of the supporting part in a manner rotatably mounted by a second bearing. One of the rotors is supported radially against the other by a third bearing. The rotor of one of the first or second electric machine is radially supported by a fourth bearing.

20 Claims, 5 Drawing Sheets

ELECTRIC MACHINE ARRANGEMENT

CROSS-REFERENCE TO RELATED APPLICATIONS

This application is the U.S. National Phase of PCT Appln. No. PCT/DE2021/100533, filed Jun. 23, 2021, which claims the benefit of German Patent Appln. No. 102020122246.7, filed Aug. 26, 2020, the entire disclosures of which are incorporated by reference herein.

TECHNICAL FIELD

The present disclosure relates to an electric machine arrangement, comprising a first electric machine and a second electric machine, each having a stator and each having a rotor. In addition, the machine arrangement comprises a common housing in which the two electric machines are arranged to be axially adjacent to one another, as well as an output shaft that is in rotationally fixed contact with the rotor of the first electric machine and an output shaft that is in rotationally fixed contact with the rotor of the second electric machine. The rotor of the first electric machine is rotatably mounted on the side thereof that is averted from the second electric machine via a first bearing and is radially supported in or on a supporting part of the housing, and the rotor of the second electric machine is on the side thereof that is averted from the first electric machine via a second bearing rotatably mounted in or on a supporting part of the housing arranged to be radially supported, and one of the two rotors, on the side thereof that faces the other rotor, is supported radially against the other rotor via a third bearing.

BACKGROUND

A high level of comfort, compact design, low weight, high power density and low costs have always played an important role in motor vehicles. This also applies to the drive units of motor vehicles that can be driven by electric motors, what are termed electric vehicles or hybrid vehicles. For electric drive units, it can therefore make conceptual sense to accommodate several motors directly adjacent to one another within a common housing. Several electric machines or electric motors in a vehicle offer the possibility of driving different wheels differently and thereby improving driving comfort and driving dynamics. It is also possible to optimize the motors for different speed ranges and, depending on the speed, to use different motors or motor combinations to drive the vehicle. Also, with regard to a modular system, several motors that can be optionally integrated into one vehicle offer the interesting possibility of installing different numbers of motors to be able to easily adapt the driving performance of the motor vehicle to the customer's wishes. Arranging several engines directly adjacent to one another instead of distributing them in the vehicle also has a number of advantages. By concentrating the motors and the associated power electronics in one place, one can use synergies and limit the region in which special effort is required for sealing, high-voltage safety, cooling, and safety monitoring.

However, arranging several motors directly adjacent to one another also makes the mechanical connection and mounting of the motors more difficult. Functionally, a coaxial arrangement of two motors in a common housing is ideal in most cases. However, there is then usually no more space for a conventional mounting for the two rotors.

SUMMARY

The object of the disclosure is to provide an electric machine arrangement in which a multi-machine arrangement arranged in a common housing is improved with regard to the mounting of the electric machines or with regard to the mounting of the machine components of the electric machines. In particular, such a multi-machine arrangement should be improved with a view to what is termed the buckling stability along the drive axis.

The object is achieved by an electric machine arrangement having one or more of the features described herein. A machine arrangement according to the disclosure comprises a first electric machine and a second electric machine, each having a stator and each having a rotor, a common housing in which the two electric machines are arranged to be axially adjacent to one another, and an output shaft in rotationally fixed contact with the rotor of the first electric machine and an output shaft in rotationally fixed contact with the rotor of the second electric machine. In each case, the rotor of the first electric machine is arranged on the side thereof that is averted from the second electric machine so as to be rotatably mounted via a first bearing in or on a supporting part of the housing, and the rotor of the second electric machine is located on the side thereof that is averted from the first electric machine so as to be radially supported via a second bearing in or on a support portion of the housing. Furthermore, one of the two rotors is radially supported on the side thereof that faces the other rotor via a third bearing against the other rotor, and according to the disclosure, the rotor of the first electric machine or the rotor of the second electric machine is arranged to be radially supported via a fourth bearing. This achieves the advantage that improved buckling stability of the machine arrangement is achieved.

Further advantageous embodiments according to the disclosure are specified below and in the claims. The features listed individually in the claims can be combined with one another in a technologically meaningful manner and can define further embodiments according to the disclosure. In addition, the features indicated in the claims are specified and explained in more detail in the description, wherein further preferred embodiments are shown.

First, the individual elements of the claimed subject matter are explained in the order in which they are named in the set of claims or according to their relevance with respect to the disclosure, and particularly preferred embodiments of the subject matter according to the disclosure are described below.

Electric machines are used to convert electrical energy into mechanical energy and/or vice versa, and generally comprise a stationary part referred to as a stator, stand, or armature, and a part referred to as a rotor or runner, and arranged to be movable relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The housing encloses the electric machine. A housing can also accommodate the control and power electronics. The housing can furthermore be part of a cooling system for the electric machine and can be designed in such a way that cooling fluid can be supplied to the electric machine via the housing and/or the heat can be dissipated to the outside via the housing surfaces. In addition, the housing protects the electric machine and any electronics that might be present from external influences.

The stator of a radial flux machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are embedded into the electrical lamination running parallel to the rotor shaft and accommodate the stator winding or parts of the stator winding. On the basis of the construction towards the surface, the slots can be closed with locking elements such as locking wedges or covers or the like to prevent the stator winding from being detached.

A rotor is the rotating (spinning) part of an electric machine. In particular, a rotor is used when there is also a stator. The rotor generally comprises a rotor shaft and one or more rotor bodies arranged on the rotor shaft in a rotationally fixed manner. The rotor shaft can also be hollow, which on the one hand saves weight and on the other hand allows lubricant or coolant to be supplied to the rotor body. If the rotor shaft is hollow, components, for example shafts, from adjacent units can protrude into the rotor or through the rotor without negatively influencing the functioning of the electric machine.

The gap between the rotor and the stator is called the air gap. In a radial flux machine, this is an axially extending annular gap with a radial width that corresponds to the distance between the rotor body and the stator body. The magnetic flux in an electric axial flux machine, such as an electric drive machine of a motor vehicle designed as an axial flux machine, is directed axially in the air gap between the stator and rotor, parallel to the axis of rotation of the electric machine. The air gap that is formed in an axial flux machine is thus essentially in the form of an annular disk.

The magnetic flux in an electric axial flux machine, such as an electric drive machine of a motor vehicle designed as an axial flux machine, is directed axially in the air gap between the stator and rotor, parallel to the axis of rotation of the electric machine. With axial flux machines, a differentiation is made in terms of their development, among other things, between axial flux machines in an I-arrangement and axial flux machines in an H arrangement. An axial flux machine in an I-arrangement is understood as meaning an electric machine in which a single rotor disk of the electric machine is arranged between two stator halves of a stator of the electric machine and can be acted upon by a rotating electromagnetic field. An axial flux machine in an H arrangement is understood to be an electric machine in which two rotor disks of a rotor of the electric machine accommodate a stator of the electric machine in the annular space located axially therebetween, via which the two rotor disks can be subjected to a rotating electromagnetic field. The two rotor disks of an electric machine in an H arrangement are mechanically connected to one another. This usually takes place via a shaft or a shaft-like connecting element, which protrudes radially inward (radially inside the magnets of the electric machine) through the stator and connects the two rotor disks to one another radially inward. A special form of the H-arrangement is represented by electric machines for which two rotor disks are connected to one another radially on the outside (radially outside of the magnets of the electric machine). The stator of this electric machine is then fastened radially on the inside (usually on one side) to a component that supports the electric machine. This special form of the H arrangement is also known as the J arrangement.

According to an advantageous embodiment, it can be provided that the fourth bearing is arranged on the first rotor or on the second rotor and is supported in the radial direction against a component of the electric machine arrangement, wherein the component is different from the first rotor and is different from the second rotor. The fourth bearing is particularly preferably supported against the housing by a support element in the radial direction. It can hereby be achieved that radially occurring buckling forces can be supported efficiently and the stability of the machine arrangement is improved.

The support element is preferably designed as an axially elastic annular disk, as a result of which a structurally simple and space-saving solution for the radial connection of the fourth bearing was found.

In the context of this embodiment, it is advantageous to arrange the fourth bearing immediately adjacent to the third bearing and radially inward on the same rotor body, as a result of which the arrangement can be further optimized with regard to a small installation space.

According to a further particularly preferred embodiment, it can be provided that the fourth bearing is arranged between the rotor shaft and an output shaft coaxially surrounding the rotor shaft in some regions. On the one hand, this arrangement of the fourth bearing enables an alternative embodiment to the embodiment described above, in which the support is supported against a housing part. On the other hand, what is termed a fourth bearing can also be "doubled" and additionally formed at the point in the machine arrangement arranged differently from the first point, as a result of which the arrangement can be further stabilized without needing to take up any significant additional space.

In the arrangement between the rotor shaft and the coaxial output shaft, the fourth bearing is advantageously designed as a needle bearing to be able to save corresponding installation space and weight here. The fourth bearing is then particularly preferably arranged in the axial direction at the height of a bearing supporting the output shaft, as a result of which the support of buckling forces can be further improved.

It can also be advantageous to further develop the disclosure in such a way that the first bearing and/or the second bearing and/or the third bearing and/or the fourth bearing is/are formed by a roller bearing, wherein the first bearing and the second bearing and the third bearing are preferably designed as angular contact ball bearings. The advantage that can be realized in this way is that a bearing arrangement with corresponding buckling stability can be integrated into the machine arrangement with structurally simple means in a space-saving manner.

According to a further preferred embodiment of the subject matter according to the disclosure it can be provided that the first bearing and the second bearing are arranged in an O arrangement to one another, which further improves the stability of the arrangement and the running properties of the roller bearings in this construction.

Finally, the disclosure can also be advantageously implemented in such a way that the output shaft which is connected in rotationally fixed manner to the rotor of the first electric machine, is mounted on the axial side of the first electric machine that is averted from the second electric machine, and the output shaft which is connected in rotationally fixed manner to the rotor of the second electric machine stationary output shaft, is mounted on the axial side of the second electric machine that is averted from the first electric machine, in or on a supporting part within the housing, each via a roller bearing. This further optimizes the stability of the arrangement.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so explanations from other figures can also be used.

In the figures.

DETAILED DESCRIPTION

FIGS. 1-4 all each show an electric machine assembly 1, comprising a first electric machine 21 and a second electric machine 22, wherein the first and second electric machine 21, 22 are each designed as a permanently excited synchronous machine for an E-axle of an electrically driven motor vehicle. Each electric machine 2 has a respective stator 31; 32 and a respective rotor 41; 42. Furthermore, the two electric machines 21; 22 are each arranged in a common housing 7 in which they are arranged to be axially adjacent to one another. In addition, the machine arrangement 1 comprises an output shaft 101 in rotationally fixed contact with the rotor 41 of the first electric machine 21 and an output shaft 102 in rotationally fixed contact with the rotor 42 of the second electric machine 22. In the housing 7, the rotor 41 of the first electric machine 21 is arranged on the side thereof that is averted from the second electric machine 22 via a first bearing 611 rotatably mounted via a supporting part S of the housing 7. In the housing 7, the rotor 42 of the second electric machine 22 is also arranged analogously on the side thereof that is averted from the first electric machine 21 via a second bearing 612 rotatably mounted via a supporting part S of the housing 7. Further shown is how the two rotors 41, 42 are supported axially against one another in the region between the two electric machines 21, 22 via a third bearing 613 and the rotor 42 of the second electric machine 22 is supported radially against the housing 7 via a fourth bearing 614.

Figure 1:
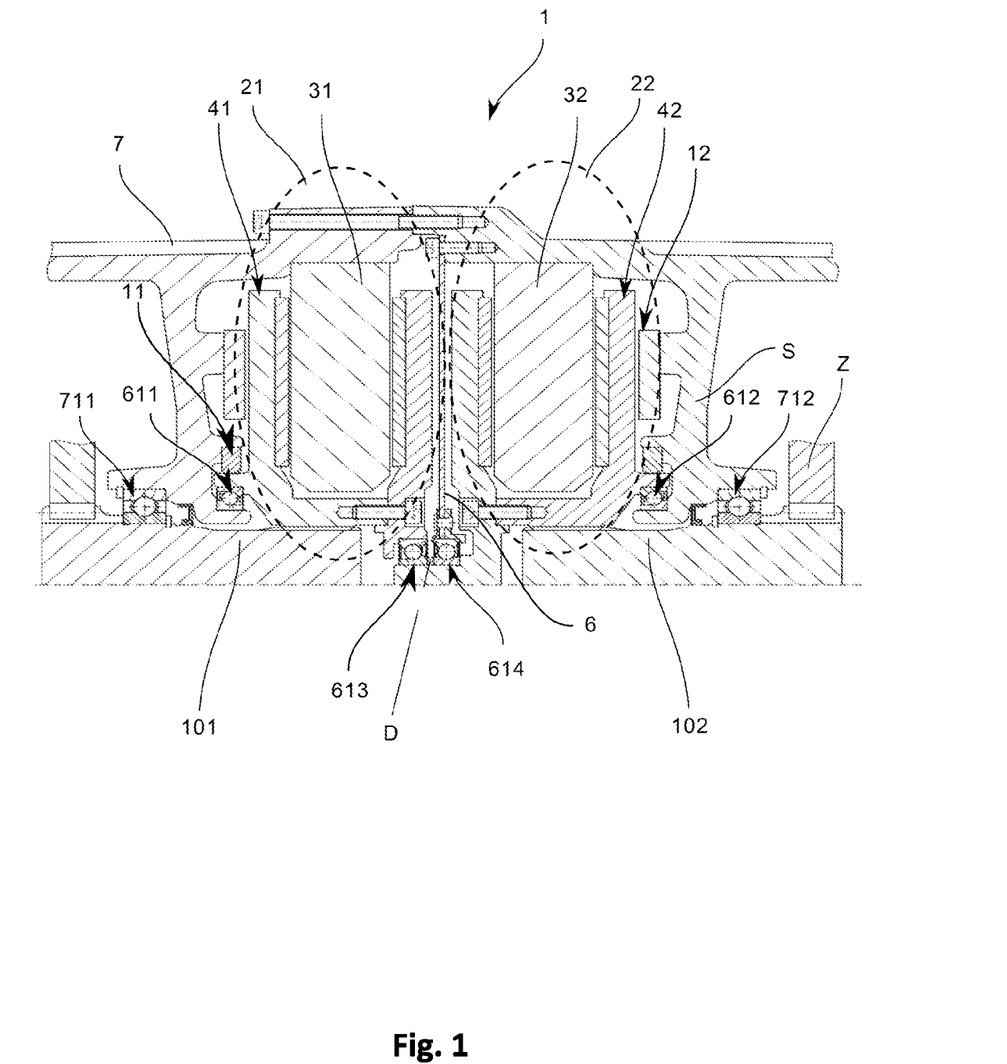
FIG. 1 shows an electric machine arrangement having two axially adjacent axial flux machines in an H arrangement in a first embodiment, in the form of a section of an E-axle (electrically driven axle having integrated electric motors) for a motor vehicle, in an axial section in a schematic representation.
Figure 2:
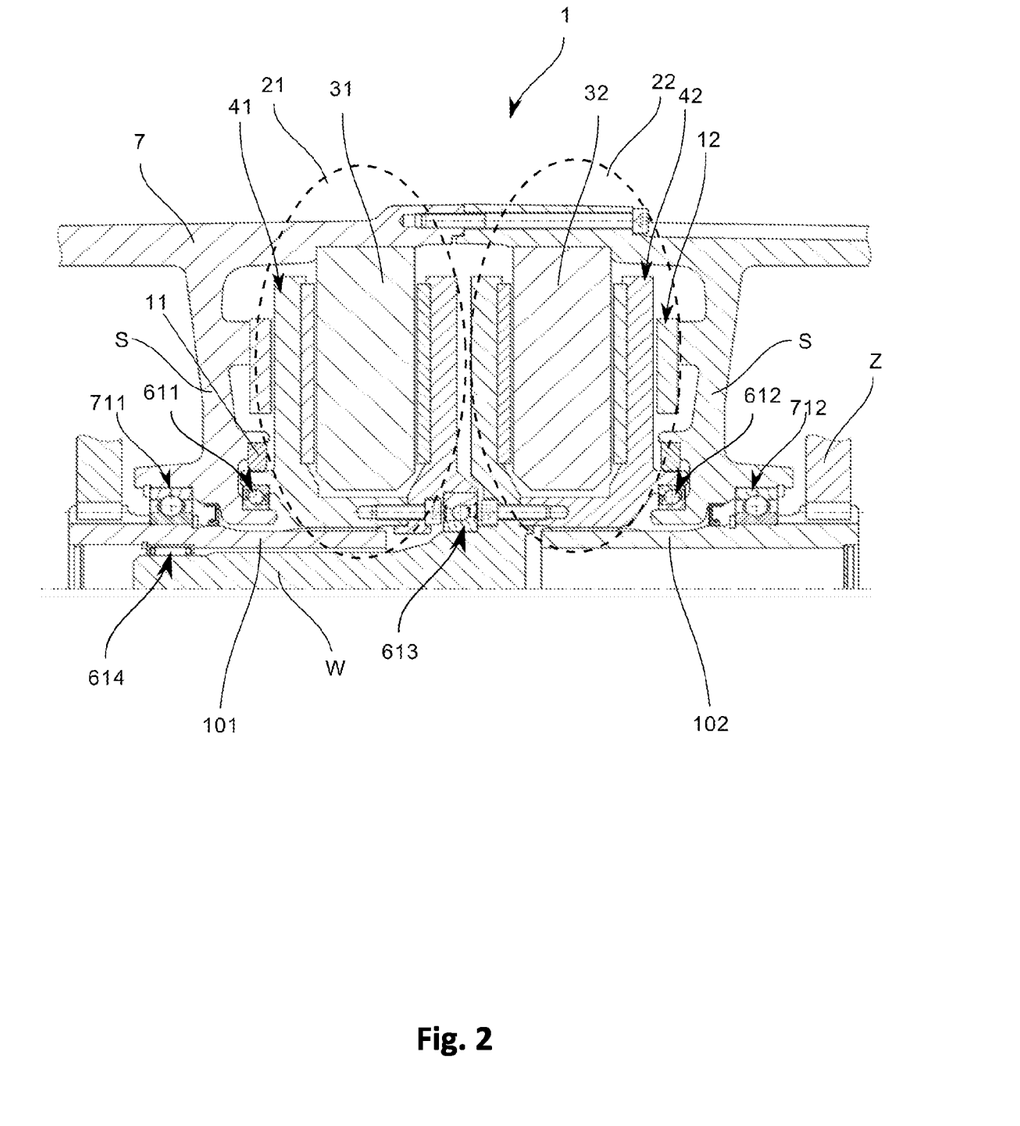
FIG. 2 shows an electric machine arrangement having two axially adjacent axial flux machines in an H arrangement in a second embodiment, in the form of a section of an E-axle (electrically driven axle having integrated electric motors) for a motor vehicle, in an axial section in a schematic representation.
Figure 3:
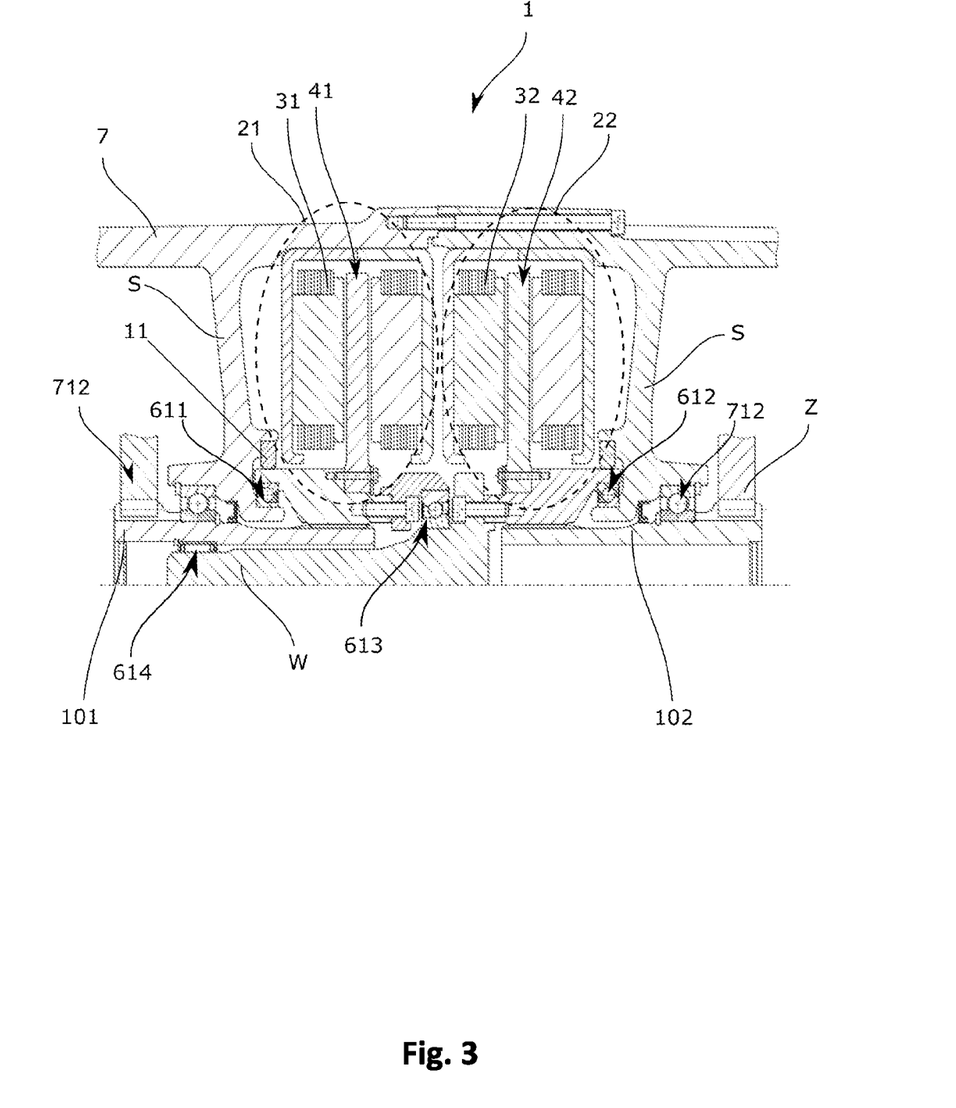
FIG. 3 shows an electric machine arrangement having two axial flux machines arranged to be axially adjacent in an I arrangement, analogous to the embodiment according to FIG. 2.
Figure 4:
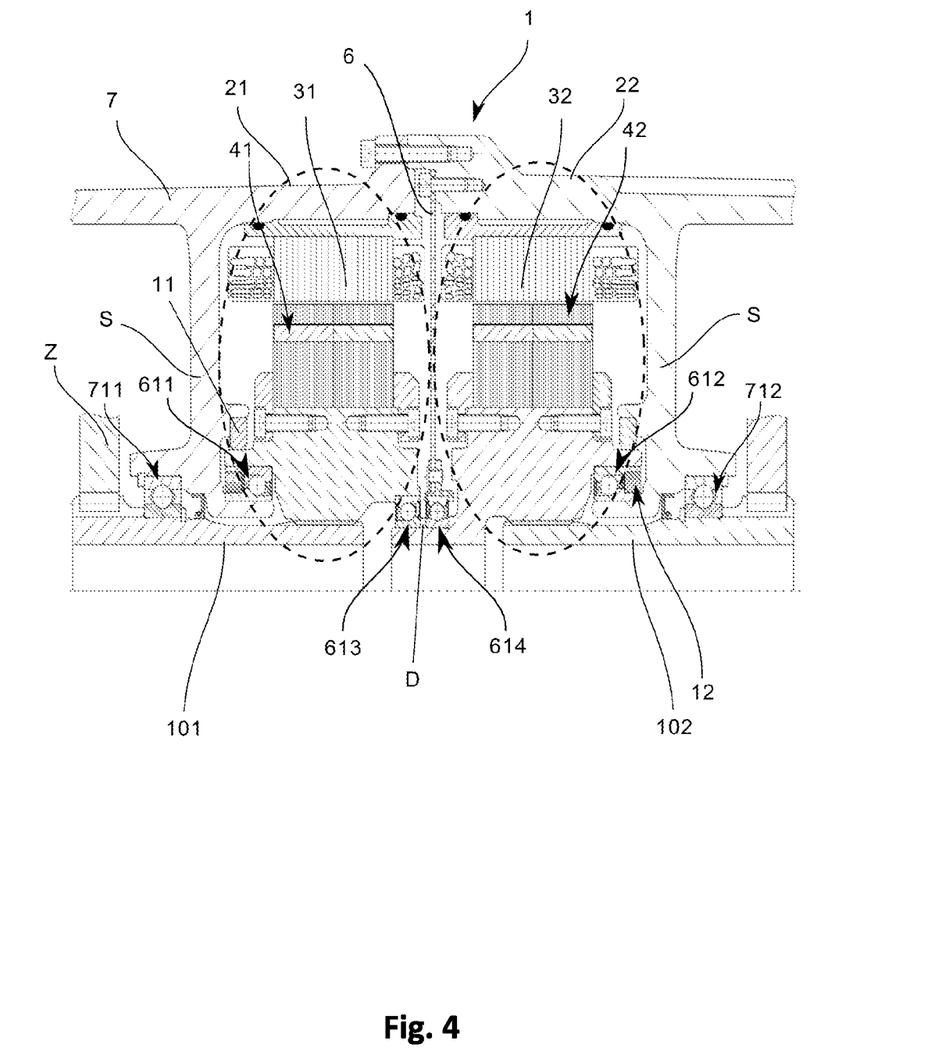
FIG. 4 shows an electric machine arrangement having two radial flux machines arranged to be axially adjacent, analogous to the embodiment according to FIG. 1.
Figure 5:
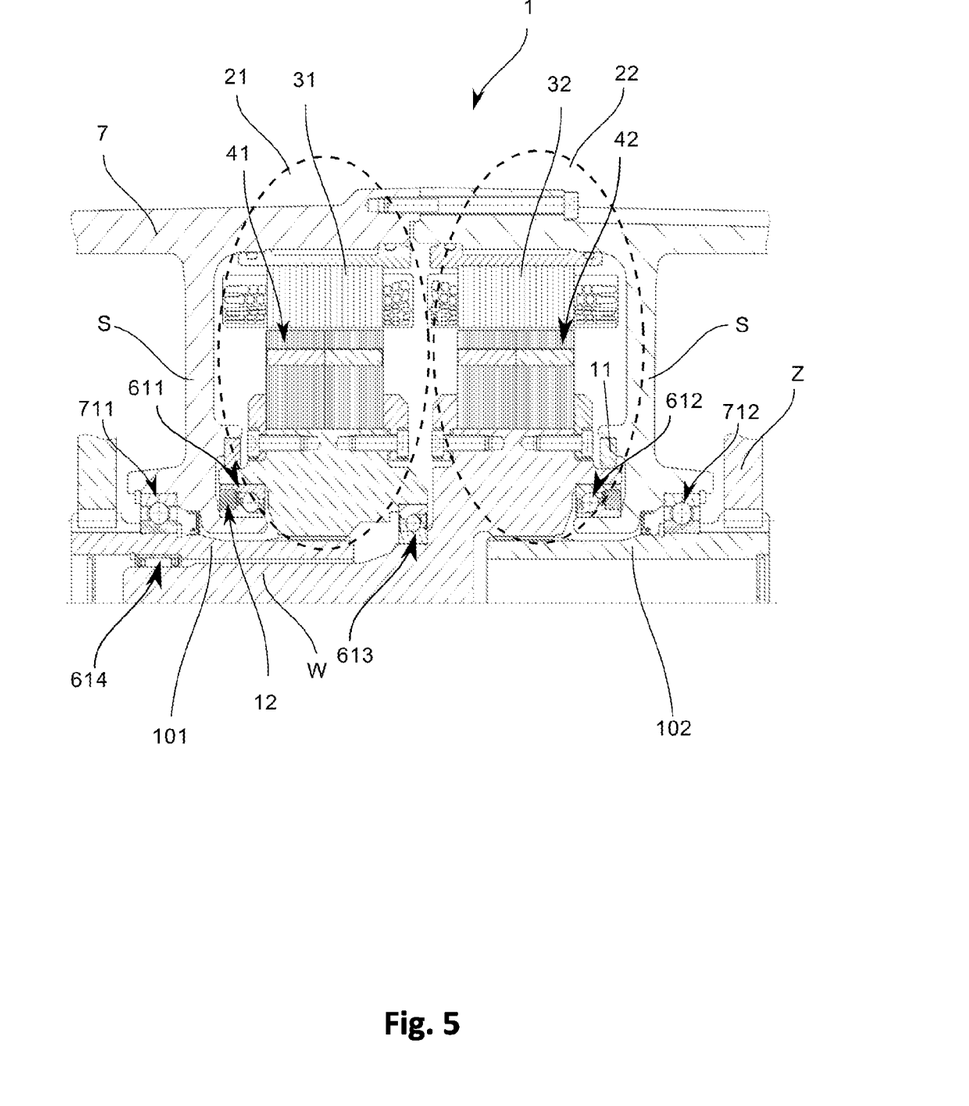
FIG. 5 shows an electric machine arrangement having two radial flux machines arranged to be axially adjacent, analogously to the embodiment according to FIG. 2.

Depending on the embodiment, the fourth bearing 614 is arranged to be either directly axially adjacent to the third bearing 613 in the region between the two electric machines 21, 22 (see FIGS. 1 and 4) or between a rotor shaft section of the rotor shaft W, which is coaxially positioned in some regions in one of the output shafts 101, 102 protrudes, and the output shaft 101, 102 itself mounted (see FIGS. 2, 3, and 5). In the latter case, the fourth bearing 614 is designed as a needle bearing and is positioned axially at the height of a bearing 711, 712 supporting the output shaft 101, 102.

According to the exemplary embodiments shown in FIG. 1 and FIG. 2, the electric machine arrangement 1 is designed in the form of an electrically driven axle for a motor vehicle, having two integrated electrical axial flow machines in an H arrangement. Alternatively, an embodiment having axial flow machines in other configurations, such as an I configuration or a J configuration, is also possible. The H-arrangement axial flux machines are positioned adjacent to one another and arranged in a common housing 7. Each axial flux machine comprises a stator 31; 32 which is fastened radially outward inside the housing 7, and a rotor 41; 42. The rotor 41; 42 consists radially on the inside of a hollow-shaft-like section which is connected via splines to the output shaft 101; 102, and connects on the right and left to disk-shaped sections of the rotor 41, 42 or the rotor body, which extend radially outwards adjacent to the stator 31; 32. The rotors 41; 42 of the two electric machines 21; 22 are connected to one another in the middle by a bearing point 613 and on the opposite side on each of the other electric machine 21; 22, each having a bearing 611; 612 supported on the housing 7. Between the stator 31; 32 and the two disk-shaped sections of the rotors 41; 42 are the air gaps through which runs the axial magnetic flux of the respective electric machine 21; 22. The rotors 41; 42, which are driven by the magnetic spring of the electric machine 2, transmit their torque via the adjacent gear to one wheel each (not shown in the figures) at the end of the electric machine arrangement 1 (here: E axis). The gearing is indicated in the illustration by a gear stage Z. At the disk-shaped rotor section, which faces away from each of the other electric machines 21; 22, a measuring surface is provided in this exemplary embodiment, which can be detected and evaluated by the rotor position sensor 12 attached to the housing 7. In this exemplary embodiment, one grounding ring 11 each is provided between the rotor 41; 42 and the housing 7, via which induced or conducted currents in the respective rotor 41; 42 can be discharged to the housing 7.

In the embodiment according to FIG. 1, the radial support of the middle bearing point, in which the third bearing 613 is arranged to be adjacent to the fourth bearing 614, is carried out via a thin disk-shaped radial-elastic connecting element 6, which is designed as a sheet metal part (flex plate) and which is connected at the inner radial end thereof to the outer ring of the fourth bearing 614, and which is connected at the outer radial end thereof to the housing 7. For example, the radially elastic connecting element 6 is made from one or more layers of spring steel sheet, fine-grain structural steel sheet, or stainless steel sheet. The disk-shaped connecting element 6 can also be made of electrically non-conductive and non-ferromagnetic materials (useful because of the proximity to the electric motors), such as plastics, ceramic materials, or composite materials such as GRP (glass fiber-reinforced plastic). The disk-shaped connecting element 6 is fastened to the housing 7 radially on the outside. For this purpose, centering and fastening points are distributed over the circumference of the housing 7. The centering can be done by a snug fit or centering fit on the outer diameter of the connecting element 6 and the attachment can be realized by screws.

The connecting element 6 is connected to the fourth bearing 614 radially on the inside. In the exemplary embodiment shown, this is realized in that the bearing 614 is pressed into a snug fit or centering fit on the inner diameter of the connecting element 6, and is held axially on one side by a rigid sleeve and on the other side by an elastic washer. Due to its thicker material cross-section, the rigid sleeve is able to align the bearing 614 and the connecting element 6 exactly with one another. The elastic washer (thin material cross-section) ensures that the bearing 614 is always in axial contact with the axial stop of the rigid sleeve by means of an axial preload on the bearing outer ring. At the same time, the axial tolerances of the bearing ring, of the sleeve, of the connecting element 6 and of the elastic disk itself can be compensated for by their elasticity. The rigid sleeve, the connecting element and the elastic washer can thus be riveted together in a simple manner. The bearing inner ring of the bearing 614 connected to the housing 7 via the connecting element 6 is slipped onto a rotor shaft section W connected to the rotor 42 of the right-hand electric machine 22. So that the fourth bearing 614 can transmit radial forces well, this bearing 614 is designed as a grooved ball bearing. To the left thereof, the third bearing 613 embodied as an angular contact ball bearing is attached to the same rotor shaft section W, which supports the rotor 41 of the left-hand electric machine 21 on the rotor shaft section W. Both rotors 41, 42 are thus centered radially via the rotor shaft section W and are connected to the housing 7. Axial forces are also transmitted via the middle bearing point. The left rotor 41 is mounted in an O arrangement by two angular contact ball bearings (611, 613). The rotor 41 exerts outward axial forces via the one bearing 611 that connects the rotor 41 to the housing side wall and through the bearing 613 that connects the rotor 41 to the rotor shaft section W of the other rotor 42. The angular contact ball bearing mounted on the rotor shaft section W is therefore supported with the inner ring thereof on a spacer ring D, which transmits the axial force to the inner ring of the adjacent fourth bearing 614, designed as a deep groove ball bearing, which is then supported on a shaft shoulder of the rotor shaft section W. The axial force is then transmitted into the housing 7 via the right-hand rotor 42 and the angular contact ball bearing (612) between the right-hand rotor 42 and the adjacent housing side wall. Axial forces arising from the right-hand rotor 42 and its bearing can also be dissipated into the left-hand side wall of the housing via the rotor 41 of the left-hand electric machine 21 via the same axial force-transmission path. By the spacer ring D between the two bearings (613, 614) slipping onto the rotor shaft section W, length tolerances in the path just described can be compensated for by installing a spacer ring with the correct thickness. The fourth bearing 614 embodied as a deep groove ball bearing, which is connected to the housing 7 by the connecting element 6, is positioned axially by the rotors 41, 42. Axial tolerances between the resulting bearing position and the attachment point between the housing 7 and the connecting element 6 are compensated for by the axial flexibility of the thin connecting element 6.

As far as the ensemble of the electric machine arrangement 1 is concerned, it can be described as follows:

In the exemplary embodiment shown, the right-hand electric machine 22 is first inserted into the associated housing half. The assembly consisting of the connecting element 6 and the fourth bearing 614 is then pushed onto the rotor shaft section W of the rotor 42 of the right-hand electric machine 22 and screwed into the housing 7 radially on the outside. The electric machine 21 shown on the left is also inserted into the housing half thereof. The angular contact ball bearing (613), which is later supported on the rotor shaft section W, is already connected to the rotor 41 of the machine 21 on the left. As a result, in both subassemblies, each consisting of a housing half and the built-in electric machine 21, 22, the axial distance between the contact surface with which the respective housing half will later rest against the other housing half and the respective end face of the bearing inner ring, which will later be supported on the spacer ring D, can be measured. The correct spacer ring thickness for this structure can be determined from the two measurements. A spacer ring, of the correct thickness, is then fitted onto the rotor shaft section W before the two housing halves are pushed together and bolted.

FIG. 2 shows an electric machine arrangement 1 having two axially adjacent electric machines 21; 22 designed as axial flux machines in an H arrangement in a second embodiment. In this second mounting concept, which is implemented in the second exemplary embodiment, bearings are arranged at a total of four different locations. However, the motor arrangement and its basic functions are identical to those of the first exemplary embodiment described above. For this reason, only the details by which exemplary embodiment 2 differs from exemplary embodiment 1 will be described here.

The two rotors 41, 42 of the two electric machines 21, 22 are also connected to the housing 7 on the outside (on the side facing away from the other electric machine 22, 21) via a bearing 611, 612 each (e.g., an angular contact ball bearing). There is also a third bearing point 613 in the middle between the two rotors 41, 42. There, however, the electric machines 21, 22 are connected to one another only by a single-row angular contact ball bearing. So that this bearing variant cannot buckle in the middle, one of the electric machines 22 is equipped with a rotor shaft section W, which protrudes into the output shaft 101, which is designed as a hollow shaft, of the other electric machine 101 and supports itself at the end region thereof via a further bearing 614 on the inside of the output shaft 101. In this exemplary embodiment, the fourth bearing 614 at the end of the rotor shaft section W is designed as a needle bearing or needle sleeve and is located at least partially radially inside the bearing 711 with which the drive shaft 101 is mounted in the housing 7. By locating the end of the rotor shaft section W within the bearing 614 radially supporting the output shaft 101, unwanted movements of the output shaft 101 such as shaft deflection or wobbling have little effect on the radial position of the rotor shaft section W. By choosing a bearing that is not axially fixed (floating bearing), the output shaft 101 can even move slightly axially without this being transmitted to the rotor shaft section W in a disruptive manner. Particularly good bearing properties are achieved when the rotor shaft section W is about 0.5 to twice as long as the width of the electric machine 21, 22 to which it is connected. In addition, the fourth bearing 614 at the end of the rotor shaft section W should be positioned axially as close as possible to the plane in which is located the bearing 711 with which the output shaft 101 is mounted in the housing 7.

The rotor 42 of the electric machine 22 shown on the right in FIG. 2 is thus supported at three points. On the far right, on the side thereof facing away from the other electric machine 21, the rotor 42 is supported on the side wall of the housing with an angular contact ball bearing (612), which can transmit axial and radial forces. The angular contact ball bearing (613) between the two rotors 41, 42 supports the right-hand electric machine 22 in the axial direction via the second rotor 42 on the opposite housing wall. The rotor 42 of the right-hand motor 22 is again radially supported by the bearing point 614 at the end of the rotor shaft section W. The right-hand rotor 42 is supported very solidly in the housing 7 by the three bearing points (612, 613, 614). On both sides of the rotor 42 there is a point at which axial forces can be transmitted and there is also a point at which radial forces can be transmitted. The rotor 41 of the left-hand electric machine 21 is supported on the side wall of the housing on the left, on the side thereof facing away from the other electric machine 22, with an angular contact ball bearing (611), which can transmit axial and radial forces. On the opposite side (the side facing the other electric machine 22), the rotor 41 is supported on the rotor shaft section W of the right-hand electric machine 22 with a second angular contact ball bearing (613), which can also transmit axial and radial forces. Both rotors 41, 42 are thus supported in a solid and buckling-resistant manner.

In both exemplary embodiment 1 and exemplary embodiment 2, the rotors 41, 42 of the two axial flux motors designed in an H arrangement are designed in such a way that only the inner rotor halves (the rotor halves that face the other electric machine) of the two electric machines 21, 22 differ. This allows the two engines to be made largely from the same parts. Essentially, the two electric machines 21, 22 differ only in the parts of the inner rotor halves that accommodate the bearings (613; 613, 614) of the central bearing point.

FIG. 3 shows an electric machine arrangement 1 having two electric machines 2 arranged to be axially adjacent and designed as axial flux machines in an !-arrangement, analogously to the embodiment according to FIG. 2. With regard to the description and mode of operation, reference is made at this point to the explanations relating to FIG. 2.

FIG. 4 shows an electric machine arrangement 1 having two electric machines 21; 22 arranged to be axially adjacent and designed as radial flux machines—analogously to the embodiment described in FIG. 1 having axial flow machines, which is why reference is made to the explanations relating to FIG. 1 at this point with regard to the description and mode of operation.

FIG. 5 shows an electric machine arrangement 1 having two electric machines 21; 22 arranged to be axially adjacent and designed as radial flux machines—analogously to the embodiment described in FIG. 2 having axial flow machines, which is why reference is made to the explanations relating to FIG. 1 at this point with regard to the description and mode of operation.

The disclosure is not limited to the embodiments shown in the figures. The above description is therefore not to be regarded as limiting, but rather as explanatory. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Electric machine arrangement
21 Electric machine
22 Electric machine
31 Stator
32 Stator
41 Rotor
42 Rotor
6 (Axially elastic) support element
7 Housing
101 Output shaft
102 Output shaft
11 Grounding ring
12 Rotor position sensor
611 First bearing
612 Second bearing
613 Third bearing
614 Fourth bearing
711 Roller bearing (output shaft)
712 Roller bearing (output shaft)
S Supporting part (housing)
Z Gear stage
W Rotor shaft section
D Spacer ring

The invention claimed is:

1. An electric machine arrangement, comprising:
a first electric machine and a second electric machine, the first and second electric machines each comprises an electric motor having a permanently excited synchronous machine for providing driving torque to a respective wheel of an electrically drivable motor vehicle, each having a stator and each having a rotor, and a common housing in which the first and second electric machines are arranged to be axially adjacent to one another;
a first output shaft in rotationally fixed contact with the rotor of the first electric machine and a second output shaft in rotationally fixed contact with the rotor of the second electric machine;
wherein the rotor of the first electric machine on a side thereof facing away from the second electric machine is rotatably mounted via a first bearing and radially supported in or on a supporting part of the housing;
wherein the rotor of the second electric machine on a side thereof facing away from the first electric machine is arranged rotatably mounted via a second bearing and radially supported in or on the supporting part of the housing, and one of the two rotors is supported radially against the other rotor on a side thereof that faces the other rotor via a third bearing; and
the rotor of the first electric machine or the rotor of the second electric machine is radially supported via a fourth bearing.

2. The electric machine arrangement according to claim 1, wherein the fourth bearing is arranged on the rotor of the first electric machine or on the rotor of the second electric machine and is supported in a radial direction against a component of the electric machine arrangement, and the component is different from the first rotor and is different from the second rotor.

3. The electric machine arrangement according to claim 1, wherein the fourth bearing is supported in a radial direction against the housing via a support element.

4. The electric machine arrangement according to claim 3, wherein the support element comprises an axially elastic annular disk.

5. The electric machine arrangement according to claim 1, wherein the fourth bearing is formed or arranged to be immediately adjacent to the third bearing and radially inwards on a same rotor body.

6. The electric machine arrangement according to claim 1, wherein the fourth bearing is arranged between a rotor shaft and one of the first or second output shafts coaxially surrounding the rotor shaft in regions.

7. The electric machine arrangement according to claim 6, wherein the fourth bearing comprises a needle bearing.

8. The electric machine arrangement according to claim 6, wherein the fourth bearing is arranged in an axial direction at a level of one of the bearings supporting the first or second output shaft.

9. The electric machine arrangement according to claim 1, wherein at least one of the first bearing, the second bearing, the third bearing, or the fourth bearing comprises a roller bearing.

10. The electric machine arrangement according to claim 1, wherein the first bearing and the second bearing are each formed by an angular contact ball bearing.

11. The electric machine arrangement according to claim 1, wherein the first output shaft in a rotationally fixed connection with the rotor of the first electric machine and the second output shaft in a rotationally fixed connection with the rotor of the second electric machine are each mounted via a respective roller bearing in or on a supporting part of the housing.

12. The electric machine arrangement according to claim 1, wherein the first bearing and the second bearing and the third bearing comprise angular contact ball bearings.

13. The electric machine arrangement according to claim 10, wherein the angular contact ball bearings are arranged in an O arrangement with respect to one another.

14. An electric machine arrangement, comprising:
a first electric machine and a second electric machine, each comprising an electric motor for providing driving torque to a respective wheel of an electrically drivable motor vehicle and having a permanently excited synchronous machine, and each having a stator and a rotor;
a common housing in which the first and second electric machines are arranged axially adjacent to one another;
a first output shaft rotationally fixed with the rotor of the first electric machine and a second output shaft rotationally fixed with the rotor of the second electric machine;
wherein the rotor of the first electric machine on a side thereof facing away from the second electric machine is rotatably mounted via a first bearing and radially supported in or on a supporting part of the housing;
wherein the rotor of the second electric machine on a side thereof facing away from the first electric machine is arranged rotatably mounted via a second bearing and radially supported in or on the supporting part of the housing, and one of the two rotors is supported radially against the other rotor on a side thereof that faces the other rotor via a third bearing; and the rotor of the first electric machine or the rotor of the second electric machine is radially supported via a fourth bearing.

15. The electric machine arrangement according to claim 14, wherein the fourth bearing is arranged on the rotor of the first electric machine or on the rotor of the second electric machine and is supported in a radial direction against a component of the electric machine arrangement, and the component is different from the first rotor and is different from the second rotor.

16. The electric machine arrangement according to claim 14, the fourth bearing is supported in a radial direction against the housing via a support element.

17. The electric machine arrangement according to claim 16, wherein the support element comprises an axially elastic annular disk.

18. The electric machine arrangement according to claim 14, wherein the fourth bearing is formed or arranged to be immediately adjacent to the third bearing and radially inwards on a same rotor body.

19. The electric machine arrangement according to claim 14, wherein the fourth bearing is arranged between a rotor shaft and one of the first or second output shafts coaxially surrounding the rotor shaft at least in regions.

20. The electric machine arrangement according to claim 19, wherein the fourth bearing comprises a needle bearing.

* * * * *